G. R. CARLSON.
DRAFT ATTACHMENT.
APPLICATION FILED DEC. 27, 1918.
1,321,714.
Patented Nov. 11, 1919.
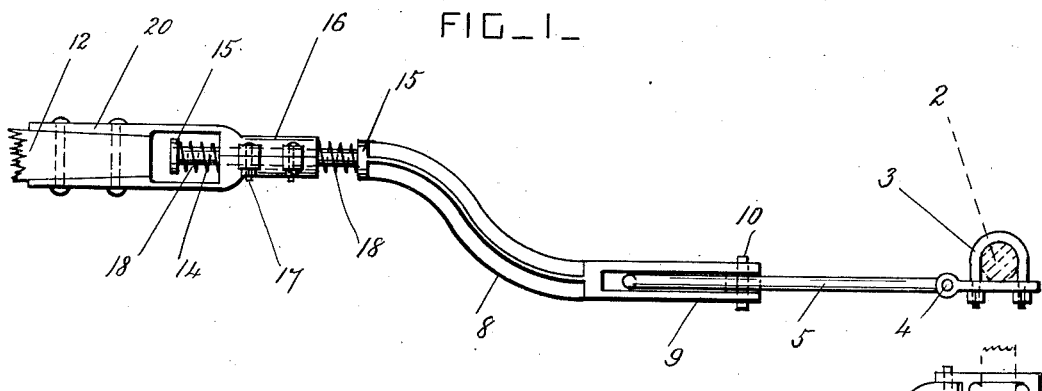
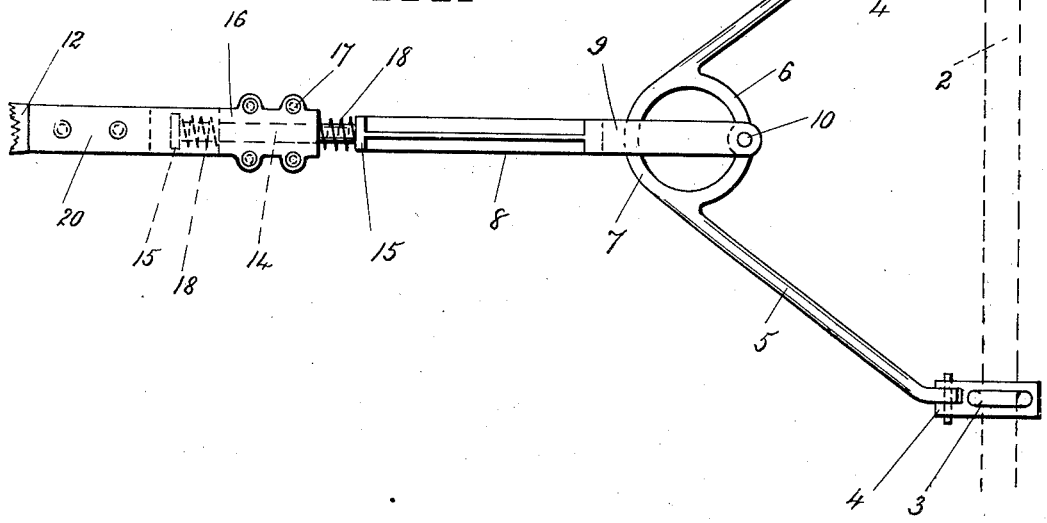
Inventor.
Gust R. Carlson
by Herbert W. Jenner.
Attorney.

UNITED STATES PATENT OFFICE.

GUST R. CARLSON, OF McINTOSH, SOUTH DAKOTA.

DRAFT ATTACHMENT.

1,321,714.                 Specification of Letters Patent.       Patented Nov. 11, 1919.

Application filed December 27, 1918. Serial No. 268,474.

*To all whom it may concern:*

Be it known that I, GUST R. CARLSON, a citizen of the United States, residing at McIntosh, in the county of Corson and State of South Dakota, have invented certain new and useful Improvements in Draft Attachments, of which the following is a specification.

This invention relates to attachments for connecting trucks to the axles of motor cars or other similar vehicles; and it consists in the novel construction and combination of the parts hereinafter fully described and claimed.

In the drawings, Figure 1 is a side view of a draft attachment constructed according to this invention. Fig. 2 is a plan view of the same.

The motor car, tractor or other similar vehicle is of any approved construction, and 2 is its rear axle. Clips 3 are secured to this rear axle at suitable distances apart, and have eyes 4 on their rear sides. An angle-shaped crossbar 5 is provided, and its ends are pivoted to the eyes 4 so that it is free to vibrate vertically. A curved bar 6 is welded to or otherwise secured to the crossbar 5, and extends across the apex portion of its angle, so that these parts form an approximately circular fifth wheel 7, at the rear part of the crossbar and midway of the said clips and axle.

A central draft bar 8 is provided, and its front end portion consists of a double-eye 9 which straddles the fifth wheel 7. This double-eye is pivoted to the curved bar 6 by a vertical pin 10. The truck is of any approved construction, and it is provided with a draft pole 12. The rear end portion of the draft bar 8 is connected to the draft pole 12, and the draft bar is suitably curved, inclined or cranked to suit the distances of the axle and the draft pole above the ground level.

The draft bar 8 is preferably connected to the draft pole by a swivel joint. The rear end portion 14 of the draft bar is cylindrical and it has two collars 15 at its ends. The cylindrical portion 14 is journaled in a bearing 16 which is formed in two parts secured together and to the draft pole by bolts 17. The cylindrical portion is also preferably arranged to slide longitudinally in the bearing 16, and shock-absorbing springs 18 are interposed between the collars 15 and the ends of the bearing, but these springs may be omitted if desired.

The bearing 16 is secured to the draft pole in line with its axis by means of connecting plates 20, or other suitable connecting devices, and the connection of the draft bar with the draft pole may be otherwise modified in carrying out this invention, so as to adapt it to different trucks.

What I claim is:

1. In a draft attachment, clips adapted to be secured to a vehicle axle, a crossbar provided with arms arranged at an angle to each other and formed of rods and having their front ends pivoted to the said clips, said crossbar having a curved rear end portion and a curved bar extending crosswise between its arms and forming with its rear end portion a substantially circular member, and a central draft bar having a forked front end portion which straddles the rear end portion of the crossbar and is pivoted to its said curved bar.

2. In a draft attachment, clips adapted to be secured to a vehicle axle, a crossbar provided with arms arranged at an angle to each other and formed of rods and having their front ends pivoted to the said clips, said crossbar having a curved rear end portion and a curved bar extending crosswise between its arms and forming with its rear end portion a substantially circular member, a central draft bar having a forked front end portion which straddles the rear end portion of the crossbar and is pivoted to its said curved bar, and a draft pole provided at its front end with a longitudinal bearing in which the rear end portion of the draft bar is free to oscillate.

In testimony whereof I have affixed my signature.

GUST R. CARLSON.